(12) United States Patent
Une et al.

(10) Patent No.: US 7,862,439 B2
(45) Date of Patent: Jan. 4, 2011

(54) PLUNGING CONSTANT VELOCITY UNIVERSAL JOINT

(75) Inventors: Naohiro Une, Shizuoka-ken (JP); Katsuhiro Suzuki, Shizuoka-ken (JP); Tatsuhiro Goto, Shizuoka-ken (JP)

(73) Assignee: NTN Corporation, Osaka-shi (JP)

( * ) Notice: Subject to any disclaimer, the term of this patent is extended or adjusted under 35 U.S.C. 154(b) by 554 days.

(21) Appl. No.: 11/791,840

(22) PCT Filed: Jan. 30, 2006

(86) PCT No.: PCT/JP2006/301488
§ 371 (c)(1),
(2), (4) Date: Nov. 7, 2007

(87) PCT Pub. No.: WO2006/082781
PCT Pub. Date: Aug. 10, 2006

(65) Prior Publication Data
US 2008/0146354 A1   Jun. 19, 2008

(30) Foreign Application Priority Data
Feb. 4, 2005   (JP) .............................. 2005-029047

(51) Int. Cl.
*F16D 3/226* (2006.01)
(52) U.S. Cl. ....................................... 464/146; 464/906
(58) Field of Classification Search ......... 464/140–146, 464/906
See application file for complete search history.

(56) References Cited
U.S. PATENT DOCUMENTS
5,106,343 A * 4/1992 Sakaguchi et al. .......... 464/146
7,704,150 B2 * 4/2010 Mochinaga et al. ......... 464/146

FOREIGN PATENT DOCUMENTS

| EP | 0 844 412 | 5/1998 |
|----|-----------|--------|
| JP | 61-124732 | 6/1986 |
| JP | 01-188719 | 7/1989 |
| JP | 10-073129 | 3/1998 |
| WO | 98/00646  | 1/1998 |

* cited by examiner

*Primary Examiner*—Greg Binda
(74) *Attorney, Agent, or Firm*—Wenderoth, Lind & Ponack, L.L.P.

(57) ABSTRACT

Unpleasant vibration and muffled sound are restrained. A constant velocity universal joint includes an outer joint part having a plurality of track grooves formed on its cylindrical inner circumferential surface and extending in an axial direction, an inner joint part having a plurality of track grooves formed on its spherical outer circumferential surface and extending in the axial direction, six torque transmitting balls, each being put in a ball track formed by a pair of the track groove of the outer joint part and the track groove of the inner joint part, and a cage having pockets for retaining the torque transmitting balls. The center of curvatures of the spherical outer circumferential surface and the center of the spherical inner circumferential surface of the cage are offset by the same distance in the opposite directions along the axis about the center of the joint. A circumferential arrangement of the ball tracks is made with a uniform pitch, and a circumferential arrangement of the pockets of the cage is made with a random and non-uniform pitch of 55° or more.

4 Claims, 5 Drawing Sheets

PLUNGING CONSTANT VELOCITY UNIVERSAL JOINT

BACKGROUND OF THE INVENTION

1. Technical Field

The present invention relates to a ball-type plunging constant velocity universal joint, which allows both an axial displacement and an angular displacement between two shafts, namely, a driving shaft and a driven shaft. These joints are used, for example, in power transmission mechanisms of automobiles or other industrial machines.

2. Background of the Invention

A constant velocity universal joint is a mechanism that, in a power transmission system of automobiles or other industrial machines, connects a rotation axis on a driving side and a rotation axis on a driven side and transmits torque at a constant angular velocity. These joints are available in both a fixed joint and a plunging joint. While the fixed joint allows only an angular displacement, the plunging joint allows both an angular displacement and an axial displacement.

Widely known as a ball-type plunging constant velocity universal joint, which uses balls as torque transmitting elements, is a double offset constant velocity universal joint (hereinafter, referred to as a DOJ). A typical DOJ uses six or eight torque transmitting balls, and a circumferential arrangement (pitch) of the torque transmitting balls is usually made with a uniform pitch for six balls (60°) or eight balls (45°).

FIG. 10 illustrates a DOJ that uses six torque transmitting balls. The DOJ has as key constituents an outer joint part 1, an inner joint part 2, torque transmitting balls 3, and a cage 4. As shown in the figure, the torque transmitting balls are arranged at a uniform pitch of 60°. Other constituents besides these torque transmitting balls, namely, the outer joint part 1, the inner joint part 2, and the cage 4, as well as track grooves 5 and 6 formed on the outer joint part 1 and the inner joint part 2, respectively, and pockets 7 provided on the cage 4, are all arranged at a uniform pitch in accordance with the above-mentioned arrangement of the torque transmitting balls 3.

SUMMARY OF THE INVENTION

In the conventional DOJ (with six torque transmitting balls) illustrated in FIG. 10, the torque transmitting balls 3, the track grooves 6 and 5 of the inner and outer joint parts 2 and 1, and the pockets 7 of the cage 4 all have a circumferential arrangement of a uniform pitch for six (60°). In constant velocity universal joints of this type, when rotating with torque being applied, i.e., when transmitting power, a thrust force is induced in the axial direction of the constant velocity universal joint (induced thrust force). This induced thrust force fluctuates for the same number of times as the number of track grooves 5 and 6 during one complete rotation. Since, in the conventional DOJ (with six torque transmitting balls), the track grooves 5 and 6 are arranged at a uniform pitch of 60°, frequency of sixth component is produced, which may resonate with a natural frequency of a suspension of a vehicle and produce unpleasant vibration or muffled sound.

An object of the present invention is to provide a plunging constant velocity universal joint that is capable of restraining unpleasant vibration or muffled sound due to induced thrust force.

In order to achieve the above object, the present invention includes the following constituents.

A constant velocity universal joint according to the present invention includes: an outer joint part having a plurality of track grooves formed on its cylindrical inner circumferential surface and extending in an axial direction; an inner joint part having a plurality of track grooves formed on its spherical outer circumferential surface and extending in the axial direction; n number of torque transmitting balls, each being put in a ball track formed by a pair of the track groove of the outer joint part and the track groove of the inner joint part; and a cage having pockets for retaining the torque transmitting balls. In this constant velocity universal joint, the center of a spherical outer circumferential surface and the center of a spherical inner circumferential surface of the cage are offset by the same distance but in the opposite directions along the axis about the center of the joint. This constant velocity universal joint is characterized by providing means for reducing an nth component of an induced thrust that occurs and acts on the cage or the outer joint part when rotating with torque.

Here, if the number of torque transmitting balls is n, then the nth component of the induced thrust should be reduced. Hence, in the case of six torque transmitting balls, the sixth component of the induced thrust should be reduced. For example, if, in a DOJ with six balls, the sixth component of the induced thrust is to be reduced, then the circumferential arrangement of the ball tracks should be made with a non-uniform pitch (see Japanese Patent Laid-Open Publication No. Hei 01-50767). The present invention is to provide other means for reducing the nth component of the induced thrust, and the following arrangements are preferable.

(1) First, the circumferential arrangement of the ball tracks is made with a uniform pitch, and the circumferential arrangement of the pockets of the cage is made with a random and non-uniform pitch.

In this invention, only the circumferential arrangement of the pockets of the cage is made with a random and non-uniform pitch while the circumferential arrangement of the ball tracks remains with a uniform pitch. If the circumferential arrangement of the pockets of the cage is made with a non-uniform pitch, then the widths of pillars between pockets become at random. This makes the magnitude of frictional force between the outer joint part and the cage uneven when rotating with torque, thereby reducing the nth component of the induced thrust force.

(2) Secondly, the circumferential arrangement of the ball tracks is made with a uniform pitch, and the circumferential arrangement of the pockets of the cage is made with a uniform pitch. However, the circumferential lengths of the pockets are made uneven at least at one location.

In this invention, while the circumferential arrangements of the ball tracks and the cage pockets are made with a uniform pitch, the circumferential lengths of the pockets are made uneven at least at one location. This makes the widths of pillars between pockets become at random as in the case where the circumferential arrangement of the pockets of the cage are made with a random and non-uniform pitch as mentioned in (1) above. Therefore, contact areas between the inner circumferential surface of the outer joint part and the outer circumferential surface of the cage become uneven, and so does a fluctuation component of frictional force occurring at each phase, thereby reducing the nth component of the induced thrust force.

(3) Thirdly, the widths of the contact parts between the inner circumferential surface of the outer joint part and the outer circumferential surface of the cage are made uneven at least at one location.

In this invention, the widths of the contact parts between the inner circumferential surface of the outer joint part and the outer circumferential surface of the cage are made uneven at least at one location. This makes the contact areas between the inner circumferential surface of the outer joint part and the outer circumferential surface of the cage uneven as in the case where the circumferential lengths of the pockets were made uneven at least at one location as mentioned in (2) above. Accordingly, a fluctuation component of frictional force occurring at each phase becomes uneven, thereby reducing the nth component of the induced thrust force.

(4) Fourthly, surface roughness of the contact parts between the inner circumferential surface of the outer joint part and the outer circumferential surface of the cage is made uneven at least at one location.

In this invention, the surface roughness of the contact parts between the inner circumferential surface of the outer joint part and the outer circumferential surface of the cage is made uneven at least at one location. This makes a fluctuation component of frictional force occurring at each phase uneven as in the case where the widths of the contact parts between the inner circumferential surface of the outer joint part and the outer circumferential surface of the cage are made uneven at least at one location as mentioned in (3) above. Accordingly, the nth component of the induced thrust force can be reduced.

In a DOJ having any one of the structures mentioned in (1) to (4) above, it is desirable, looking in a cross sectional view including the axis of the joint, that the inner circumferential surface of the cage have its center of curvature at a point that is displaced from the center of curvature of the outer circumferential surface of the inner joint part in the radial direction and be formed with a radius of curvature that is greater than a radius of curvature of the outer circumferential surface of the inner joint part, and that a gap in the axial direction of approximately 5 to 50 μm be provided between a torque transmitting ball and a pocket of the cage.

Furthermore, in a DOJ having any one of the structures mentioned in (1) to (4) above, it is desirable that the inner circumferential surface of the cage be formed by combining a cylindrical surface having an arbitrary length in the axial direction and located at the center and partial spherical surfaces located on both sides thereof, each having the same radius of curvature as the outer circumferential surface of the inner joint part, and that a gap in the axial direction of approximately 5 to 50 μm be provided between a torque transmitting ball and a pocket of the cage.

By employing these structures, a gap in the axial direction is formed between the inner joint part and the cage, and a sliding resistance within the joint becomes considerably small. Therefore, when this constant velocity universal joint is used as drive axles of an automobile, even if vibrations from the engine are acted on with relatively small torque being applied, as in the case of a car with an automatic transmission with its engine running at idle, these vibrations are absorbed and do not propagate to the car body, thereby restraining vibrations of the car body.

According to the present invention, the nth component of the induced thrust force can be reduced by having (1) a structure where the circumferential arrangement of the ball tracks is made with a uniform pitch, and the circumferential arrangement of the pockets of the cage is made with a random and non-uniform pitch, (2) a structure where the circumferential arrangement of the ball tracks is made with a uniform pitch, the circumferential arrangement of the pockets of the cage is made with a uniform pitch, and the circumferential lengths of the pockets are made uneven at least at one location, (3) a structure where the widths of the contact parts between the inner circumferential surface of the outer joint part and the outer circumferential surface of the cage are made uneven at least at one location, or (4) a structure where surface roughness of the contact parts between the inner circumferential surface of the outer joint part and the outer circumferential surface of the cage is made uneven at least at one location. Accordingly, vibration or muffled sound of the vehicle can be restrained, and the propagation of vibrations into the cabin of a car can be prevented, ensuring the quietness of the cabin.

BRIEF DESCRIPTION OF THE DRAWINGS

FIG. 3b is a cross sectional view of FIG. 3a.

FIG. 4b is a cross sectional view of FIG. 4a.

FIG. 6b is a cross sectional view of FIG. 6a.

DETAILED DESCRIPTION OF THE INVENTION

Figure 1:
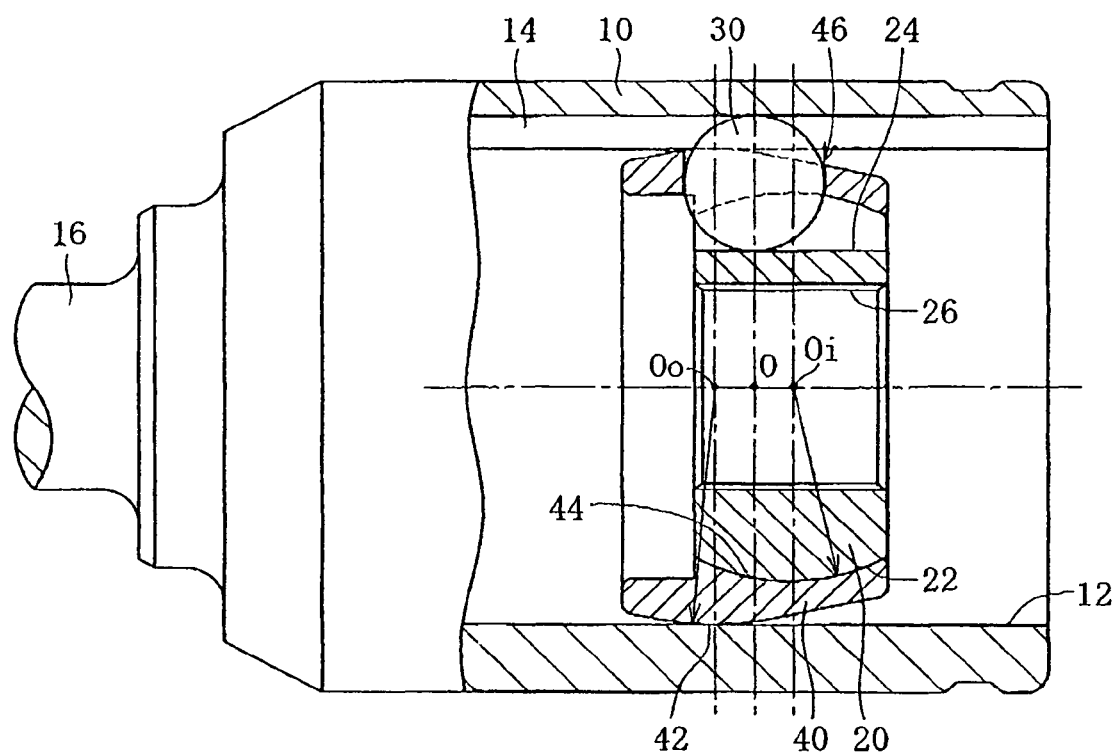
FIG. 1 is a cross sectional view illustrating an overall structure of a DOJ with six balls in one embodiment of the present invention.
Figure 2:
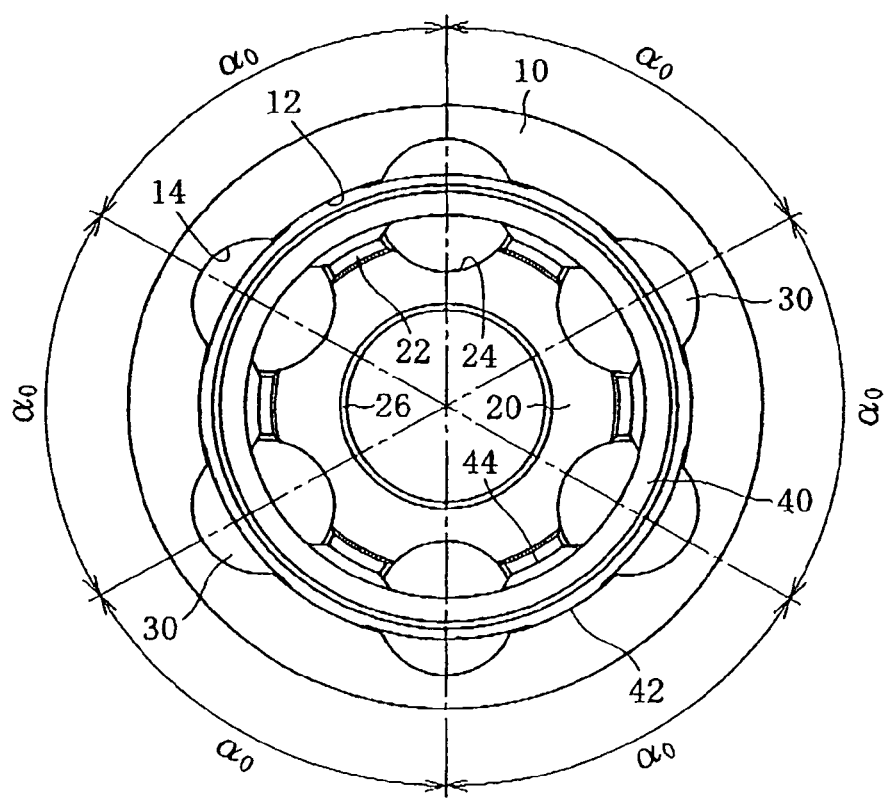
FIG. 2 is a right-side view illustrating the DOJ of FIG. 1.
Figure 3A:
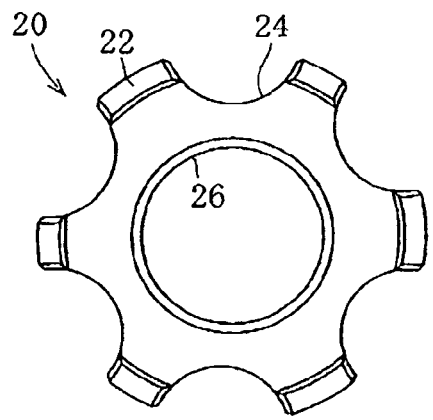
FIG. 3a is a side view illustrating the inner joint part of the DOJ of FIG. 1.
Figure 3B:
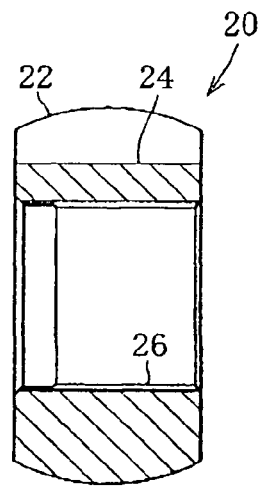
Figure 4A:
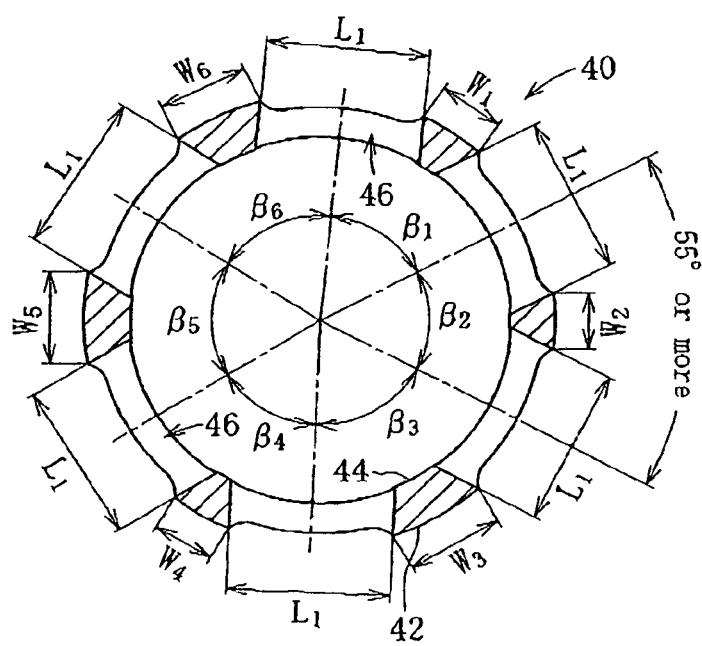
FIG. 4a is a cross sectional view of the cage of the DOJ in one embodiment of the present invention.
Figure 4B:
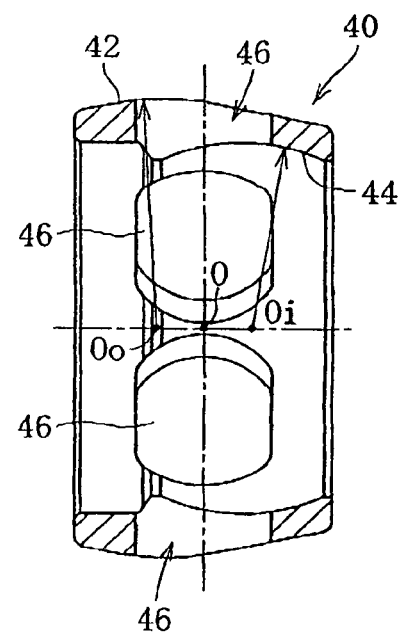

As one embodiment of the present invention, FIGS. 1 and 2 illustrate an overall structure of a DOJ with six balls, FIGS. 3a and 3b illustrate the inner joint part shown in FIG. 2, and FIGS. 4a and 4b illustrate the cage shown in FIG. 2.

The DOJ includes as key constituents an outer joint part 10, an inner joint part 20, torque transmitting balls 30, and a cage 40. The outer joint part 10 is cup-shaped with an opening at one end and has a shaft 16 on the other end that connects to a rotating shaft (see FIG. 1). An inner circumferential surface 12 of the outer joint part 10 is cylindrical in shape, and there are six track grooves 14 formed on this cylindrical inner circumferential surface 12 and extending in the axial direction (see FIG. 2). The inner joint part 20 has a spherical outer circumferential surface 22, and there are six track grooves 24 formed on this spherical outer circumferential surface 22 extending in the axial direction (see FIG. 3). The inner joint part 20 has a serrated hole 26 for connection with a rotating shaft.

A pair of the track groove 14 of the outer joint part 10 and the track groove 24 of the inner joint part 20 forms a ball track, and one torque transmitting ball 30 is put in each of these ball tracks. The torque transmitting balls 30 stay between the outer joint part 10 and the inner joint part 20 and transmit torque. Each torque transmitting ball 30 is retained within a pocket 46 that is formed in the circumference direction of the cage 40. The cage 40 makes contact at its outer circumferential surface 42 with the cylindrical inner circumferential surface 12 of the outer joint part 10 and at its inner circumferential surface 44 with the spherical outer circumferential surface 22 of the inner joint part 20.

Moreover, the center Oo of the outer circumferential surface 42 and the center Oi of the inner circumferential surface 44 of the cage 40 are mutually offset in the opposite direction about the center O of the pocket along the axis by the same distance (see FIG. 1). Therefore, when the joint transmits torque with a certain operating angle, the torque transmitting balls 30 are always positioned in a plane bisecting an angle that the axis of rotation of the outer joint part 10 makes with the axis of rotation of the inner joint part 20, thereby ensuring the constant velocity of the joint.

In this embodiment, as illustrated in FIGS. 2, 4a, and 4b, the circumferential arrangement of the ball tracks is made with a uniform pitch a0, and the circumferential arrangement of the pockets 46 of the cage 40 is made with random and non-uniform pitches β1 to β6 of 55° or more. In other words, the track groove 14 of the outer joint part 10 and the track groove 24 of the inner joint part 20 are circumferentially arranged at a uniform pitch α0 as shown in FIG. 2, and the pockets 46 of the cage 40 are circumferentially arranged at random and non-uniform pitches β1 to β6 as shown in FIG. 4a. Thus, by making the circumferential arrangement of the pockets 46 of the cage 40 with random and non-uniform pitches β1 to β6, the widths W1 to W6 of pillars between pockets of the cage 40 also become random at the same time.

Here, in the case of a DOJ with six balls, the non-uniform pitches β1 to β6 of the pockets 46 of the cage 40 needs to be 55° or more. By choosing the non-uniform pitches β1 to β6 of the pockets 46 of the cage 40 to be 55° or more as mentioned, the minimum dimension W2 of the width of the pillar between pockets required for the strength of the cage 40 is secured. In other words, if the non-uniform pitches β1 to β6 of the pockets 46 become less than 55°, then it will be difficult to secure the strength of the cage 40.

As mentioned above, the circumferential arrangement of the pockets 46 of the cage 40 is made with random and non-uniform pitches β1 to β6, and the circumferential length L1 is the same for all pockets 46 of the cage 40. The circumferential length L1 of the pocket 46 is determined by taking into consideration the circumferential displacement of the torque transmitting balls 30 at the maximum operating angle of the joint.

The induced thrust force of a DOJ produced when rotating with applied torque is attributable to a frictional force occurring between inner constituents. When considering the induced thrust force acting on the outer joint part 10, a frictional force between the track groove 14 of the outer joint part 10 and the torque transmitting ball 30 and a frictional force between the inner circumferential surface 12 of the outer joint part 10 and the outer circumferential surface 42 of the cage 40 are listed as the cause.

In the above-mentioned embodiment, by making the circumferential arrangement of the pockets 46 of the cage 40 with random and non-uniform pitches β1 to β6, the widths W1 to W6 of pillars between pockets of the cage 40 also become random. Therefore, contact areas between the inner circumferential surface 12 of the outer joint part 10 and the outer circumferential surface 42 of the cage 40 become uneven, and so does a fluctuation component of the frictional force occurring at each phase. Here, the induced thrust force, which is a combination of frictional forces of respective phases (six phases), has its sixth component being significant when fluctuations of the frictional force for respective phases display the same waveform. In this embodiment, since fluctuations of the frictional force occurring at respective phases also becomes uneven, the sixth component of the induced thrust force can be reduced.

Figure 5:
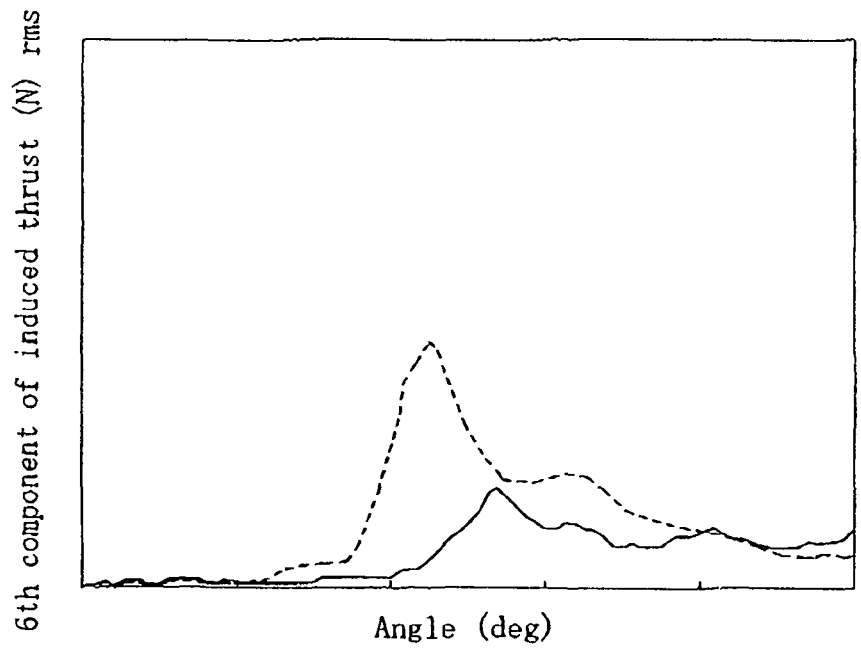
FIG. 5 is a graph illustrating the measurement result of a sixth component of the induced thrust.

FIG. 5 shows the results of the measurement of induced thrust force conducted on a conventional DOJ and a DOJ of the present invention, both being with six balls. In the figure, the horizontal axis represents the operating angle (0° to 15°) and the vertical axis represents the induced thrust (N). The broken line and the solid line represent measurements for the conventional DOJ and the DOJ of the present invention, respectively. It is apparent that the reduction effect against the sixth component of the induced thrust force has adequately manifested itself for the DOJ of the present invention.

Next, an embodiment illustrated in FIGS. 6a, 6b, and 7 will be described. As the basic structure of the DOJ is the same as that of the above-described embodiment of FIGS. 1 to 4a, and 4b, the same reference numerals and symbols are used to designate parts or regions that are substantially the same.

Figure 6A:
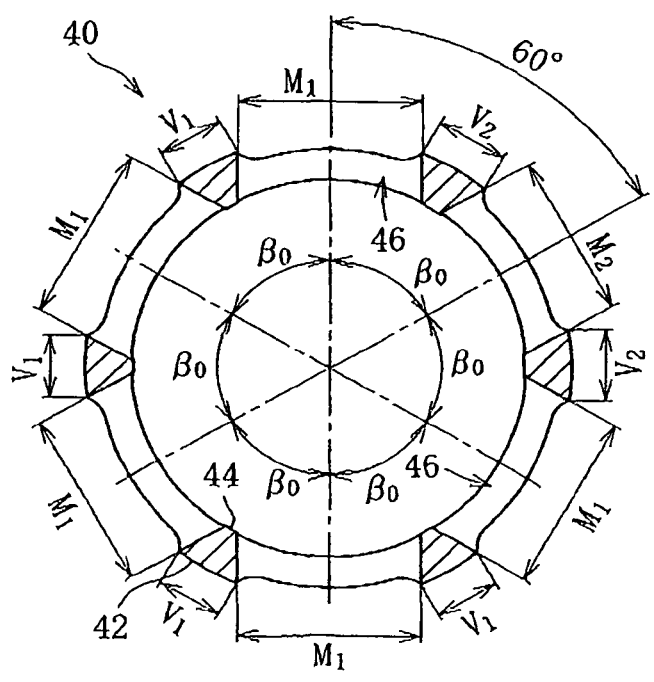
FIG. 6a is a cross sectional view of the cage of the DOJ in another embodiment of the present invention.
Figure 6B:
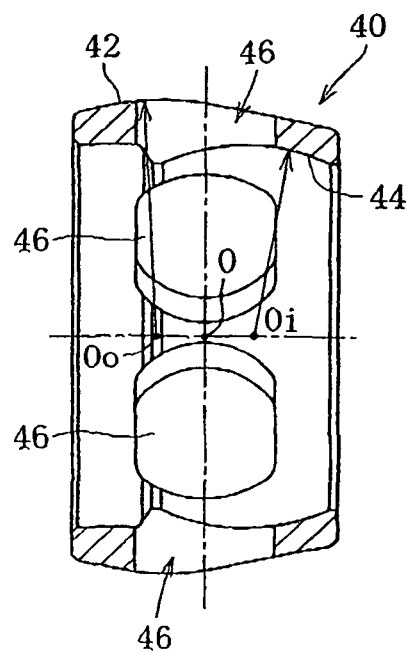

In the embodiment illustrated in FIGS. 6a and 6b, the circumferential arrangement of the pockets 46 of the cage 40 is made with a uniform pitch β0 (=60°), and the circumferential lengths of the pockets 46 are made uneven at least at one location. In this embodiment, the unevenness is achieved by choosing the circumferential length M2 of one of the pockets 46 to be different from the circumferential lengths M1 of other pockets 46 (M1 ≠M2). When making the circumferential lengths of the pockets 46 uneven, the number of uneven pockets 46 is not limited to one but may be two or more.

Accordingly, the widths of the pillars between pockets become random as in the case of the above-mentioned embodiment where the circumferential arrangement of the pockets 46 of the cage 40 is made with random and non-uniform pitches β1 to β6. In this embodiment, the widths V2 of the pillars that are positioned on both sides of the pocket 46 of the circumferential length M2 differ from the width V1 of the pillar that is positioned between the pockets 46 of the circumferential length M1, so that the unevenness is obtained (M1 ≠M2). Thus, contact areas between the inner circumferential surface 12 of the outer joint part 10 and the outer circumferential surface 42 of the cage 40 become uneven, and so does a fluctuation component of frictional force occurring at each phase, thereby reducing the sixth component of the induced thrust force.

Figure 7:
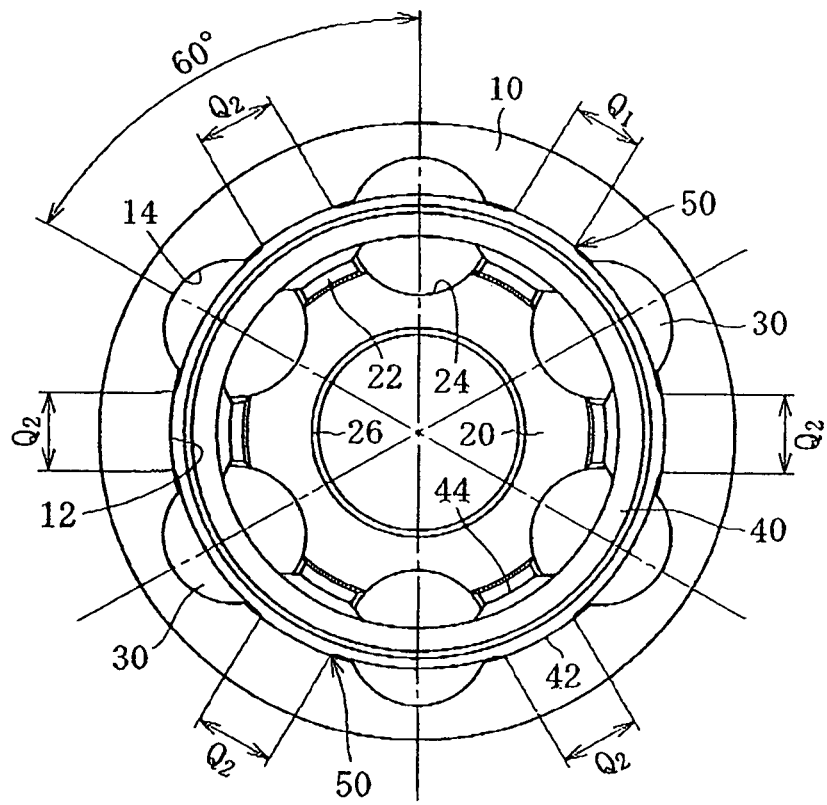
FIG. 7 is a side view illustrating the DOJ in still another embodiment of the present invention.

In an embodiment illustrated in FIG. 7, the widths of contact parts 50 between the inner circumferential surface 12 of the outer joint part 10 and the outer circumferential surface 42 of the cage 40 are made uneven at least at one location. In this embodiment, among the contact parts 50 where the inner circumferential surface 12 of the outer joint part 10 makes contact with the outer circumferential surface 42 of the cage 40, the width Q1 of one contact part 50 is made different from the width Q2 of other contact parts 50, so that the unevenness is obtained (Q1≠Q2). When making the widths of the contact parts 50 uneven, the number of uneven contact parts 50 is not limited to one but may be two or more. Here, the above-mentioned width of the contact part 50 means the width of a pillar between pockets along the outer circumferential surface of the cage 40 (see FIG. 7).

Accordingly, as in the case of the above-mentioned embodiment where the circumferential lengths of the pockets 46 are made uneven at least at one location, the contact areas between the inner circumferential surface 12 of the outer joint part 10 and the outer circumferential surface 42 of the cage 40 become uneven. This also makes a fluctuation component of frictional force occurring at each phase uneven, thereby reducing the sixth component of the induced thrust force.

In order to make a fluctuation component of frictional force occurring at each phase uneven, it is also possible to set the surface roughness of each phase at random for the inner circumferential surface 12 of the outer joint part 10 or the outer circumferential surface 42 of the cage 40. In this case, similar reduction effect against the sixth component of the induced thrust force can also be obtained as in each of the above-mentioned embodiments.

Figure 8:
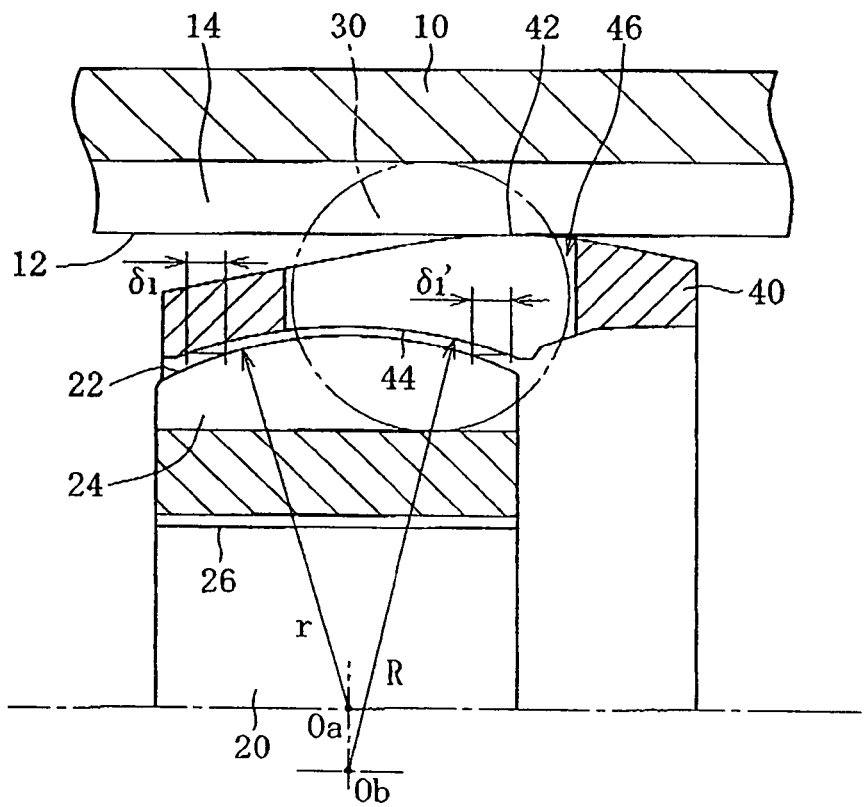
FIG. 8 is an enlarged cross sectional view of the inner joint part and the cage illustrating further embodiment.
Figure 9:
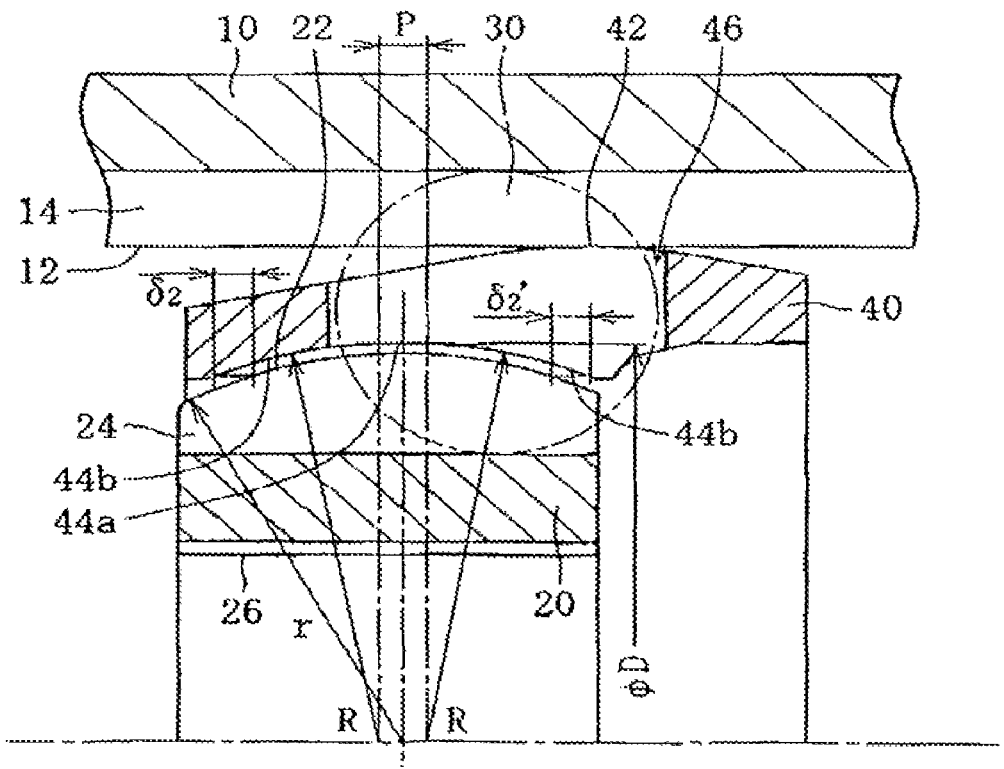
FIG. 9 is an enlarged cross sectional view of the inner joint part and the cage illustrating still further embodiment.
Figure 10:
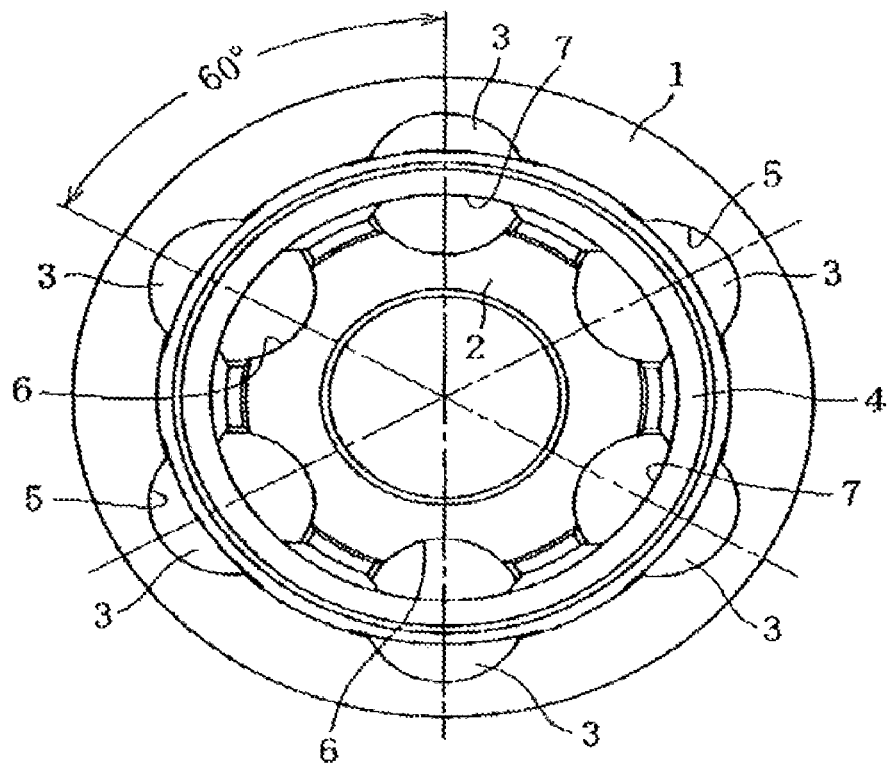
FIG. 10 is a side view illustrating a conventional DOJ (with six balls).

In embodiments illustrated in FIGS. 8 and 9, the inner joint part 20 and the cage 40 are allowed to make relative movement in the axial direction, and restraint on the torque transmitting balls 30 is relieved, so that they can roll more easily. These embodiments can be incorporated into the above-mentioned embodiments illustrated in FIGS. 1 to 7.

In the embodiment of FIG. 8, the radius of curvature r of the outer circumferential surface 22 of the inner joint part 20 is chosen to be smaller than the radius of curvature R of the inner circumferential surface 44 of the cage 40, and the center of curvature Oa of the outer circumferential surface 22 of the inner joint part 20 and the center of curvature Ob of the inner circumferential surface 44 of the cage 40 are mutually displaced in the radial direction. Accordingly, gaps $\delta 1$ and $\delta 1'$ are formed in the axial direction between the outer circumferential surface 22 of the inner joint part 20 and the inner circumferential surface 44 of the cage 40. These gaps $\delta 1$ and $\delta 1'$ allow the axial displacement of the inner joint part 20 with respect to the cage 40.

In the embodiment illustrated in FIG. 9, the inner circumferential surface 44 of the cage 40 is formed as a combination of a cylindrical surface 44a having a diameter D along an axial dimension P in the center and partial spherical surfaces 44b on both sides thereof. The radius of curvature R of the partial spherical surfaces 44b is equal to the radius of curvature r of the outer circumferential surface 22 of the inner joint part 20, and gaps $\delta 2$ and $\delta 2'$ are formed between the outer circumferential surface 22 of the inner joint part 20 and the inner circumferential surface (44a and 44b) of the cage 40.

In the embodiments illustrated in FIGS. 8 and 9, by making the circumferential arrangement of the ball tracks with a uniform pitch $\alpha 0$ and further making the circumferential arrangement of the pockets 46 of the cage 40 with random and non-uniform pitches $\beta 1$ to $\beta 2$ of 55° or more, a similar reduction effect as in the above-mentioned first embodiment is obtained in the measurement of the induced thrust force.

Furthermore, in these embodiments, the gaps $\delta 1$ and $\delta 1'$ or the gaps $\delta 2$ and $\delta 2'$ allow the inner joint part 20 and the cage 40 to make relative movement in the axial direction, and the torque transmitting balls 30 are not restrained in the pockets 46 of the cage 40 so that they can roll easily. Hence, a sliding resistance with respect to the relative movement in the axial direction of the outer joint part 10 and inner joint part 20 is considerably small. Therefore, when vibrations are transmitted from the engine side with torque being applied, smooth relative movement between the outer joint part 10 and the inner joint part 20 via the cage 40 absorbs those vibrations, thereby preventing the propagation of vibrations into the cabin.

The invention claimed is:

1. A plunging constant velocity universal joint comprising:
   an outer joint part having a plurality of track grooves formed on a cylindrical inner circumferential surface thereof and extending in an axial direction;
   an inner joint part having a plurality of track grooves formed on a spherical outer circumferential surface thereof and extending in the axial direction;
   n number of torque transmitting balls, each torque transmitting ball being disposed in a ball track formed by a pair of one track groove of the plurality of track grooves of the outer joint part and one track groove of the plurality of track grooves of the inner joint part, so as to form a plurality of ball tracks; and
   a cage having pockets for retaining the torque transmitting balls, wherein the center of a spherical outer circumferential surface and the center of a spherical inner circumferential surface of the cage are offset by the same distance in opposite directions along an axis about the center of the joint,
   wherein the ball tracks form a circumferential arrangement with a uniform pitch, and the pockets of the cage form a circumferential arrangement with a random and non-uniform pitch.

2. A plunging constant velocity universal joint according to claim 1, wherein, when looking in a cross sectional view including an axis of the joint, the inner circumferential surface of the cage has a center of curvature at a point that is displaced from the center of curvature of the outer circumferential surface of the inner joint part in the radial direction and is formed with a radius of curvature that is greater than a radius of curvature of the outer circumferential surface of the inner joint part, and a gap in the axial direction of approximately 5 to 50 μm is provided between a torque transmitting ball and a pocket of the cage.

3. A plunging constant velocity universal joint according to claim 1, wherein, the inner circumferential surface of the cage is formed by combining a cylindrical surface having an arbitrary length in the axial direction and located at a center and partial spherical surfaces located on both sides thereof, each having the same radius of curvature as the outer circumferential surface of the inner joint part, and a gap in the axial direction of approximately 5 to 50 μm is provided between a torque transmitting ball and a pocket of the cage.

4. A plunging constant velocity universal joint according to claim 1, wherein the number n of the torque transmitting balls is 6.

* * * * *